United States Patent
Mustajarvi

(10) Patent No.: US 6,356,759 B1
(45) Date of Patent: Mar. 12, 2002

(54) RESOURCE ALLOCATION MECHANISM IN PACKET RADIO NETWORK

(75) Inventor: Jari Mustajarvi, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/194,576

(22) PCT Filed: Mar. 25, 1998

(86) PCT No.: PCT/FI98/00263

§ 371 Date: Nov. 27, 1998

§ 102(e) Date: Nov. 27, 1998

(87) PCT Pub. No.: WO98/44755

PCT Pub. Date: Oct. 8, 1998

(30) Foreign Application Priority Data

Mar. 27, 1997 (FI) .................................................. 971321

(51) Int. Cl.⁷ ................................................. H04Q 7/20
(52) U.S. Cl. ........................ 455/450; 455/466; 455/464; 379/349; 379/346
(58) Field of Search ................................ 455/466, 450, 455/464; 370/347, 348, 346, 349

(56) References Cited

U.S. PATENT DOCUMENTS

| | | | |
|---|---|---|---|
| 5,590,133 A | * 12/1996 | Billstrom et al. | ........... 370/349 |
| 5,966,378 A | * 10/1999 | Hamalainen | ................ 370/348 |
| 6,031,827 A | * 2/2000 | Rikkinen et al. | ........... 370/330 |
| 6,031,832 A | * 2/2000 | Turina | ......................... 370/348 |
| 6,097,717 A | * 8/2000 | Turina et al. | ................ 370/348 |

FOREIGN PATENT DOCUMENTS

| | | |
|---|---|---|
| GB | 2 252 887 | 6/1992 |
| WO | 97/15994 | 5/1997 |

OTHER PUBLICATIONS

"Digital cellular telecommunications system (Phase 2+); General Packet Radio Service (GPRS); Overall Description of the General Packet Radio Service (GPRS) Radio Interface; Stage 2; (GMS 03.64)", GSM Technical Specification, Mar. 3, 1997, Version 1.2.0, pp. 1–47.
"GPRS RLC/MAC Block Formats (2)", Tdoc SMG2 GPRS 174/97, Jan. 22–24, 1997, pp. 1–16.

* cited by examiner

Primary Examiner—Thanh Cong Le
Assistant Examiner—Lana Le
(74) Attorney, Agent, or Firm—Pillsbury Winthrop LLP

(57) ABSTRACT

In a packet radio system (e.g. a GPRS), a network (BSS) has two different alternatives for allocating a radio resource to a mobile station (MS). In a first allocation alternative the radio resource is allocated using an uplink counter block identifier (USF) transmitted with downlink blocks. In a second allocation alternative the radio resource is allocated in a separate signalling message. A corresponding downlink block then also has an uplink counter block identifier (USF) which can acquire only a limited number of possible values. If all identifiers (USF) are allocated to different mobile stations, allocation alternative 2 cannot be used. In the invention the network leaves at least one identifier (USF) unallocated to any mobile station. In addition, the network either (1) uses the identifier in downlink blocks corresponding to blocks reserved using the second allocation alternative; or (2) at least one uplink counter block identifier (USF) is separately determined, said identifier denoting a reserved uplink block which the mobile station cannot use for transmission without a separate authorisation.

6 Claims, 2 Drawing Sheets

RESOURCE ALLOCATION MECHANISM IN PACKET RADIO NETWORK

This application is the national phase of international application PCT/FI98/000263 filed Mar. 25, 1998 which designated the U.S.

BACKGROUND OF THE INVENTION

The invention relates to packet radio systems in general and particularly to a method and arrangement for providing independence between uplink and downlink in a packet radio network, preferably in a mobile station packet radio network such as a GPRS.

The GPRS (General Packet Radio Service) is a new service in the GSM system and an object of standardization in the GSM phase 2+ in the ETSI (European Telecommunication Standard Institute). The operational environment in the GPRS comprises one or more subnetwork service areas interconnected by a GPRS Backbone Network. A subnetwork comprises a plural number of packet data service nodes, which are here referred to as GPRS support nodes (or agents), each of which is connected to the GSM mobile network so as to be able to offer a packet data service to mobile data terminal equipment via a plural number of base stations, i.e. cells. An intermediate mobile network offers circuit-switched or packet-switched data transmission between a support node and mobile data terminal equipment. The separate subnetworks are, in turn, connected to an external data network, e.g. to a PSPDN (Public Switched Packet Data Network). The GPRS service thus allows packet data transmission to be provided between mobile data terminal equipment and external data networks, with the GSM network functioning as an interface network.

With reference to FIG. 1, a typical arrangement of a GPRS network will be described. It is to be understood that the architecture in the GPRS systems is not as mature as in the GSM systems. All GPRS terminology should therefore be understood to be descriptive and not restrictive. A typical mobile station functioning as a mobile data terminal comprises a mobile station MS of a mobile network and a portable personal computer PC connected to said MS through a data interface. The mobile station can be for instance a Nokia 2110 manufactured by Nokia Mobile Phones/Finland. By means of a PCMCIA-type Nokia Cellular Datacard, manufactured by Nokia Mobile Phones/Finland, the mobile station can be connected to any portable personal computer PC provided with a PCMCIA card slot. The PCMCIA card thus provides the PC with an interface point supporting a telecommunication application protocol, such as a CCITT X.25 or an Internet Protocol IP, used on the PC. The mobile station can optionally provide a direct interface point supporting a protocol used by the PC application. A further possibility is that the mobile station MS and the computer PC are integrated into a single entity, within which the application software is provided with an interface point supporting the protocol it uses. An example of such a mobile station comprising an integrated computer is Nokia Communicator 9000, which is also manufactured by Nokia Mobile Phones/Finland.

Network elements BSC and MSC are known in a typical GSM network. The arrangement shown in FIG. 1 comprises a separate Serving GPRS Support Node (SGSN) of the GPRS service. The support node performs certain packet radio service operations in the network. Such operations include registration of the mobile stations MS in and out of the system, updating of routing areas of the mobile stations MS and routing of data packets to their correct destinations. Within the present application the term 'data' is to be understood in a broad sense to refer to any information transmitted in a digital telecommunication system. Such information can comprise speech, inter-computer data traffic, telefax data and short program code sequencies, etc., encoded into a digital form. The SGSN node can be located at a base station BTS, a base station controller BSC or a mobile switching centre MSC, or it can be located separate from all these elements. The interface between an SGSN node and a base station controller BSC is called a Gb interface. An area controlled by one base station controller BSC is called a Base Station Subsystem (BSS). Uplink refers to a direction from a mobile station MS to a network and downlink refers to a reverse direction.

In the present application, the term 'standard proposal' refers jointly to the proposals for ETSI GPRS standards, particularly to 3.64 and to supplementing proposals sent for it, particularly to Tdoc SMG2 GPRS 174/97. One of the principles of the GPRS system is that uplink and downlink capacity deployment should be independent of each other. With reference to FIG. 2, an area, significant to the understanding of the invention, of a radio resources arrangement according to the standard proposal will be described. Traffic over an air interface Um is relayed in blocks produced by a physical layer of the OSI model. Each physical block has a duration of four GSM bursts (456 bits in total), which are sent in succession on one physical channel. The amount of data carried by a physical block depends on the channel coding to be used, for which four different coding methods have been defined, i.e. CS-1, . . . , CS-4. The different coding methods are not, however, significant to the understanding of the invention.

With reference to FIG. 3, an allocation of radio resources will be described in relation to a mobile terminating connection. Item 6.6.4.4. of the standard proposal is considered to represent the prior art. Message fields, such as a TFI and a USF, will be described later in connection with FIG. 4. In FIG. 3. time proceeds from top to bottom. The Figure shows on the right-hand side, next to messages, logical channels on which the messages can be sent. The channel used is not, however, significant to the understanding of the invention.

In step 3-1, the mobile station sends a channel allocation request Packet Channel Request on a random access channel PRACH or RACH. In the channel allocation request the mobile station can request the network to allocate to it one or two time slots. In step 3-2 the network can grant an access on a Packet Access Grant channel (Immediate Assignment). In step 3-3 the mobile station sends an LLC frame which is relayed to the SGSN to inform the SGSN that the mobile station has moved to a 'Ready' state.

The allocation of radio resources (for instance in step 3-2) involves e.g. that the network allocates to the mobile station the identifiers TFI and USF. The mobile station can use one or two time slots allocated to it for sending data, or it can use the radio resources allocated to it for requesting more resources. Let us assume that the resources allocated to the mobile station by the Immediate Assignment message are not sufficient and in step 3-4 the network sends a Packet Resource Assignment message.

The Packet Resource Assignment message comprises e.g. the TFI identifier allocated to the connection; a list (in a bit chart form) of Packet Data Channels PDCH that the network uses for sending a packet; and a Packet Associated Control Channel PACCH that the mobile station is to use for acknowledging received RLC blocks (the channel being indicated by the USF allocated to the mobile station). In addition, the message can comprise e.g. information related to a timing advance and power control.

After the radio resources are allocated, the mobile station sends in step 3-5 data packets to the network. In step 3-6, the network provides a positive or a negative acknowledgement Packet Ack/Nack of the received data packets. The indication 'N times' in FIG. 3 means that the steps 3-5 and 3-6 below the dashed line are repeated for as along as the network has packets to send.

With reference to FIG. 4, the radio blocks and the fields used in them will now be described in greater detail. Each radio block comprises three parts: a MAC header, an RLC block and a Block Check Sequence BCS. The MAC header (octet 1) comprises e.g. an Uplink State Flag USF, a type field T and a Power Control field PC. A value 0 of the type field T denotes an RLC data block and a value 1 an RLC/MAC control block.

The RLC data block (in which T=0) comprises an RLC Header and an RLC information field. The RLC header (octets 2 to 3) denotes e.g. the position of the block in relation to other blocks in the sequence (BSN=Block Sequence Number). In addition, the RLC header comprises allocation and LLC frame data. An Extension bit field E shows whether an optional extension octet 4 is in use. According to the standard proposal, the intended use of the field S/P in connection with data blocks is that when said bit is in the polling state 'P', the mobile station is to send an acknowledgement (Ack/Nack) of the received blocks. The Temporary Flow Identity field TFI is used in downlink blocks to denote a receiving mobile station. The 7 bits allocated to the TFI field can be used for denoting 127 mobile stations ($2^7$=128), because one of the values is reserved for general transmissions received by all mobile stations.

In downlink blocks the USF field is used to provide a mobile station-specific authorization for transmitting a corresponding uplink block. So in a downlink block, the USF field provides an identifier of an uplink counter block. The USF field comprises 3 bits, i.e. it can acquire 8 different values. One USF field value is allocated to the mobile station receiving the packet, to denote the uplink block the mobile station is to use for acknowledging the received radio blocks. At the same time the mobile station can express its wish to use a separate uplink data channel.

If in step 3–4 all uplink radio resources are reserved and the network is for a few seconds (for six seconds according to the standard proposal) unable to allocate radio resources to the mobile station, the network sends a polling message (e.g. MAC Packet Polling), to which the mobile station responds with a Random Access Burst. This allows ensuring e.g. that the timing advance required by the mobile station location is known, even if the mobile station would move in the meantime.

To sum up, the network has two alternative ways for sending the mobile station a block-specific authorization for transmission:

Alternative 1: using the uplink counter block identifier USF conveyed in downlink blocks; or Alternative 2: using a separate signalling message (e.g. MAC Packet Polling) for allocating a radio block that the mobile station should use.

A problem with the above described arrangement is that when alternative 2 is used, the corresponding downlink block still comprises a USF identifier which can be allocated to a mobile station. Since the USF identifier can acquire only a limited number of possible values (i.e. eight different values), a situation can arise where all possible USF identifiers are allocated to different mobile stations. In such case, the above described allocation alternative 2 cannot be used, although its use would otherwise be indispensable.

A possible solution could be to increase the USF field to comprise more than three bits. The problem would thus become less significant. Another alternative solution could be a separate information field (=a bit) indicating whether the USF identifier is in use or not. At least one problem with these solutions would be that the USF field is strongly protected with channel coding, so it uses (with CS-1 coding) up to four times more bandwidth in relation to the net information content. Such an additional load reduces the capacity available to payload traffic.

BRIEF DESCRIPTION OF THE INVENTION

The invention is firstly based on a detection of a problem, which is a false reasoning behind the standard proposal. In addition to the detection of the problem, an object of the invention is to provide a mechanism that allows the above-mentioned problem to be solved.

In the invention the network leaves (at least) one USF identifier unallocated to any mobile station. In addition, either the network uses said USF identifier according to alternative 2 in downlink blocks corresponding to the reserved blocks; or at least one USF identifier value is separately determined, said value denoting a reserved uplink block. Without a separate authorization, the mobile station is not allowed to use the reserved block for transmission.

BRIEF DESCRIPTION OF THE DRAWINGS

In the following the invention will be described in greater detail in connection with preferred embodiments and with reference to the attached drawings, in which

FIG. 2 illustrates protocol layers that the invention relates to;

DETAILED DESCRIPTION OF THE INVENTION

Figure 1:
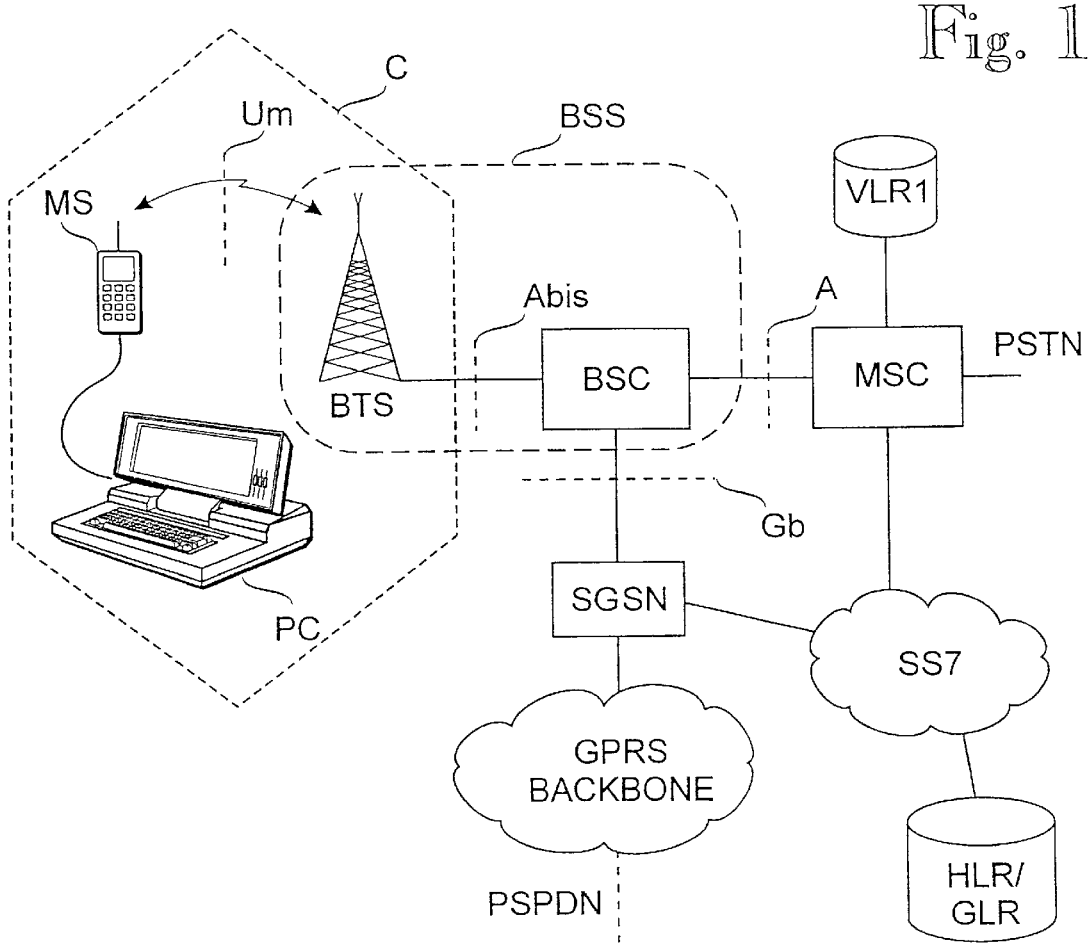
FIG. 1 is a block diagram illustrating elements of a packet radio system relating to the invention.
Figure 2:
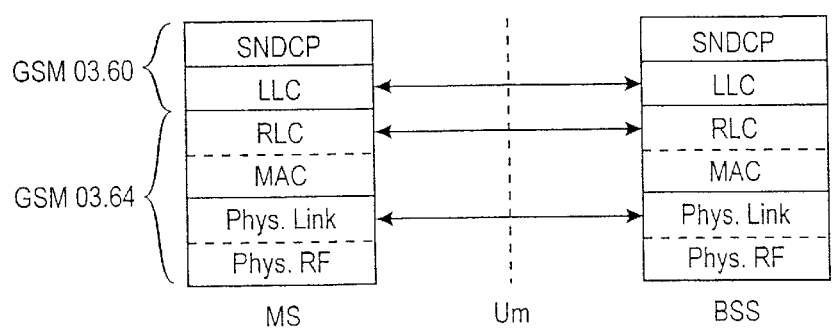
Figure 3:
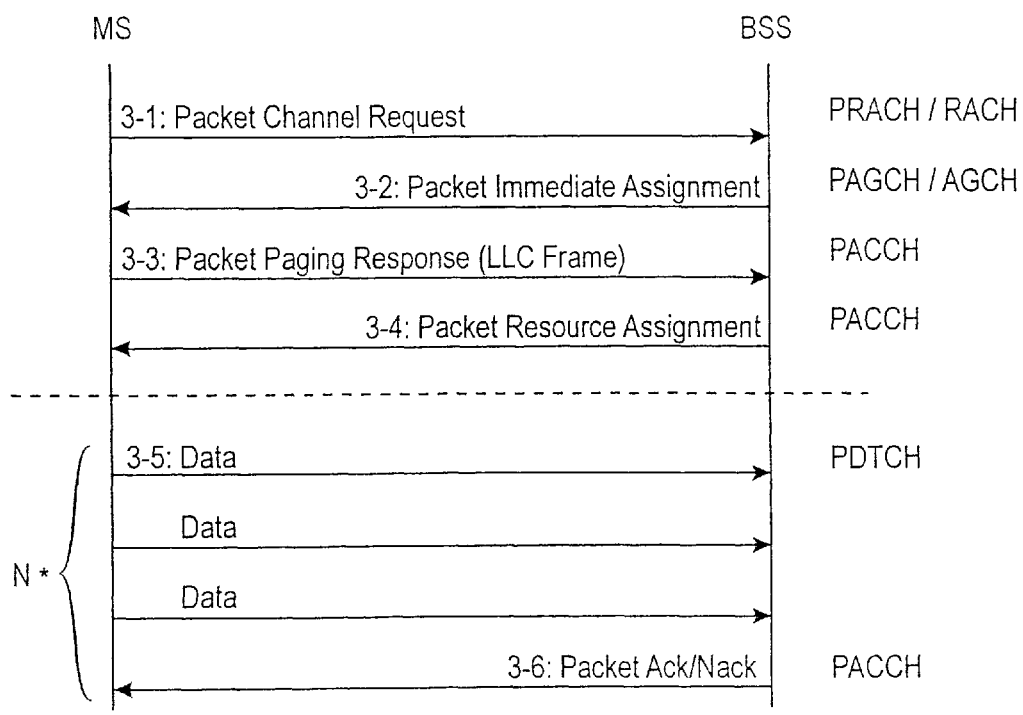
FIG. 3 illustrates allocation of radio resources.
Figure 4:
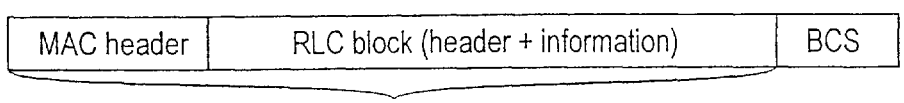
FIG. 4 illustrates a structure of blocks transmitting on the radio path.
Figure 4:
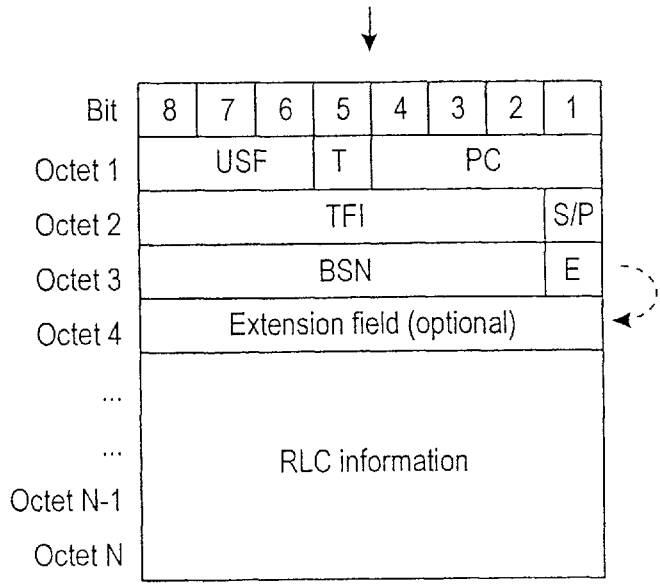

According to a first embodiment of the invention, a network leaves (at least) one USF identifier unallocated to any mobile station and uses said USF identifier according to alternative 2 in downlink blocks corresponding to reserved blocks.

According to a second embodiment of the invention, at least one USF identifier value is separately determined, said value denoting a reserved uplink block. Without a separate authorization, a mobile station is not allowed to use the reserved block for transmission.

A suitable mechanism for sending such a separate authorization is disclosed in a copending Finnish patent application 'Allocation of control channel in packet radio network' filed by the same applicant on the same date as the present application. According to said copending patent application, allocation of an uplink resource is not dependent of a possible USF identifier. Instead, the mobile station sends an uplink transmission after a predetermined time from a downlink block in which said polling field is in a polling state. When the mobile station sends an uplink transmission, the USF identifier in the corresponding downlink block should be one that is not allocated to any mobile station, so as to avoid collision in the transmissions of the mobile stations. The uplink resource is not, as in the standard proposal, allocated by using a USF identifier. Instead, the mobile station sends an uplink transmission after a predetermined time from the block in which the downlink P bit is set. The predetermined time is most advantageously a fixed period of time. This can be easily implemented in such a way that after the active P bit, the mobile station waits for a fixed number of blocks before the uplink transmission.

The most suitable number of USF identifiers that the network does not allocate to any mobile station is exactly one. This maximises the number of USF identifiers that can be used in a manner according to the standard proposal.

It is apparent to a person skilled in the art that as technology advances, the basic idea of the invention can be implemented in various different ways. The invention and its embodiments are therefore not restricted to the above-described examples, but they can vary within the scope of the claims.

What is claimed is:

1. A method for allocating a radio resource to at least one of a plurality of mobile stations for an uplink transmission in a packet radio network, the network having at least two alternative techniques for allocating the resource, the at least two techniques including:

a first technique adapted to allocate the radio resource in a first signaling message, the first signaling message assigning a radio block for the at least one mobile station to use for the uplink transmission;

a second technique adapted to allocate the radio resource in a second signaling message, the second signaling message assigning the radio block for the at least one mobile station to use for the uplink transmission;

the method comprising:

leaving at least one uplink status flag unallocated to any mobile station when the second technique is used; and using the unallocated uplink status flag in a downlink block corresponding to the radio block assigned using the second technique.

2. A method for allocating a radio resource to at least one of a plurality of mobile stations for an uplink transmission in a packet radio network, the network having at least two alternative techniques for allocating the resource, the at least two different techniques including:

a first technique adapted to allocate the radio resource in a first signaling message, the first signaling message assigning a radio block for the at least one mobile station to use for the uplink transmission;

a second technique adapted to allocate the radio resource in a second signaling message, the second signaling message assigning the radio block for the at least one mobile station to use for the uplink transmission;

the method comprising:

leaving at least one uplink status flag unallocated to any mobile station when the second technique is used; and using the unallocated uplink status flag to denote a reserved uplink block which cannot be used by any mobile station for transmission without a separate authorization.

3. A method according to claim 2, wherein the leaving comprises the network leaving exactly one uplink status flag unallocated.

4. A method according to claim 3, wherein the leaving comprises the network leaving exactly one uplink status flag unallocated.

5. A method according to claim 2, wherein the packet radio network comprises a General Packet Radio Service network.

6. A method according to claim 3, wherein the packet radio network comprises a General Packet Radio Service network.

* * * * *